(12) United States Patent
Tatum et al.

(10) Patent No.: US 12,420,602 B2
(45) Date of Patent: Sep. 23, 2025

(54) ARTICULATING TIRE VALVE STEM INSTALL-REMOVAL TOOL AND RELATED METHODS

(71) Applicant: Dill Air Controls Products, LLC, Oxford, NC (US)

(72) Inventors: George Walter Tatum, Oxford, NC (US); Graham Kendall Snyder, Graham, NC (US); Mackenzie John Owen Snyder, Haw River, NC (US); Scott R. Lakin, Stem, NC (US); Kristopher Jon Soderstrom, Raleigh, NC (US); Brian Patrick Rigney, Raleigh, NC (US)

(73) Assignee: Dill Air Controls Products, LLC, Oxford, NC (US)

( * ) Notice: Subject to any disclaimer, the term of this patent is extended or adjusted under 35 U.S.C. 154(b) by 0 days.

(21) Appl. No.: 18/370,043

(22) Filed: Sep. 19, 2023

(65) Prior Publication Data
US 2024/0092128 A1    Mar. 21, 2024

Related U.S. Application Data

(60) Provisional application No. 63/407,824, filed on Sep. 19, 2022.

(51) Int. Cl.
*B60C 25/18*    (2006.01)
(52) U.S. Cl.
CPC .................................... *B60C 25/18* (2013.01)
(58) Field of Classification Search
CPC ...................................................... B60C 25/18
See application file for complete search history.

(56) References Cited

U.S. PATENT DOCUMENTS

| | | | | |
|---|---|---|---|---|
| 1,415,865 A * | 5/1922 | Brown | ..................... | B60C 25/18 157/1.1 |
| 2,305,886 A * | 12/1942 | Mahler | .................... | B60C 25/04 157/1.17 |
| 2,940,167 A | 6/1960 | Boyer | | |
| 3,545,314 A * | 12/1970 | Docter | .................... | B29C 73/08 81/15.7 |
| 6,202,510 B1 * | 3/2001 | Kupelian | ................ | B29C 73/08 81/15.5 |
| 6,543,112 B1 * | 4/2003 | Knaebel | ................... | B60C 25/18 29/221.5 |
| 2008/0163471 A1 * | 7/2008 | Spaulding | ........... | B25B 27/0035 29/221.5 |
| 2016/0303929 A1 * | 10/2016 | Deniau | ............... | B25B 27/0035 |
| 2018/0186201 A1 * | 7/2018 | Hsu | ...................... | B25B 27/0035 |
| 2023/0139548 A1 * | 5/2023 | Lee | ......................... | B25B 27/24 29/221.5 |

FOREIGN PATENT DOCUMENTS

DE    102011001139 A1 *    9/2012    ............. B60C 25/18
GB          794844 A *    5/1958    ............. B25B 27/02

* cited by examiner

*Primary Examiner* — Kyle A Cook
(74) *Attorney, Agent, or Firm* — UB Greensfelder LLP; Brian Turung

(57) ABSTRACT

An articulating tire valve install-removal tool and related methods for use. The articulating tire valve install-removal tool has a body comprising an outer perimeter, an inner recess, a threaded member, a linkage and a contact member. The articulating tire valve install-removal tool components facilitate in the valve being installed and removed perpendicular or generally perpendicular to the valve hole on the wheel.

18 Claims, 4 Drawing Sheets

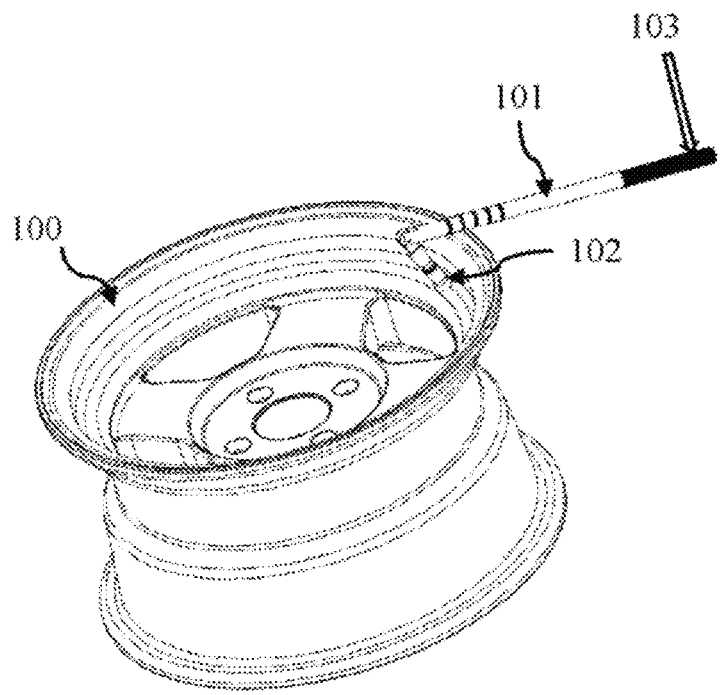
Fig. 1
Prior Art
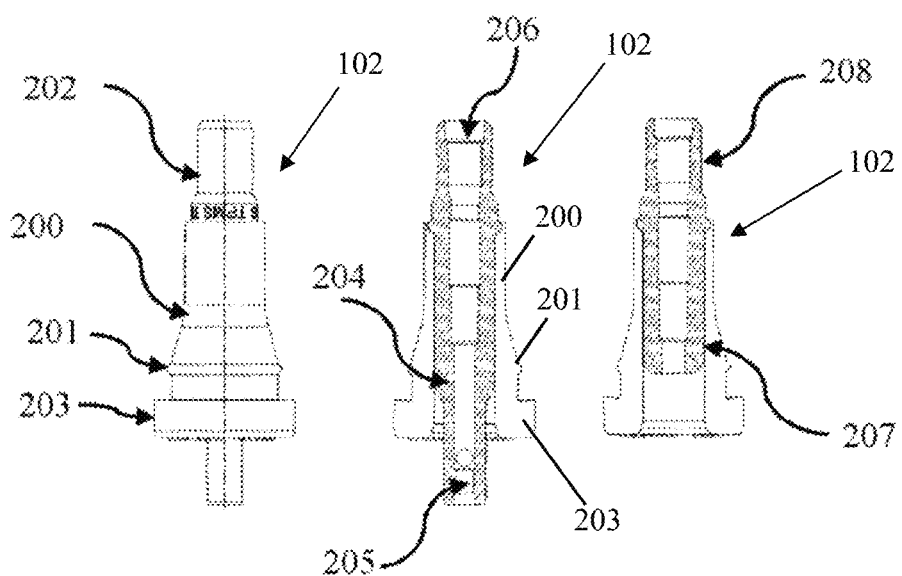
Fig. 2a
Prior Art
Fig. 2b
Prior Art
Fig. 2c
Prior Art

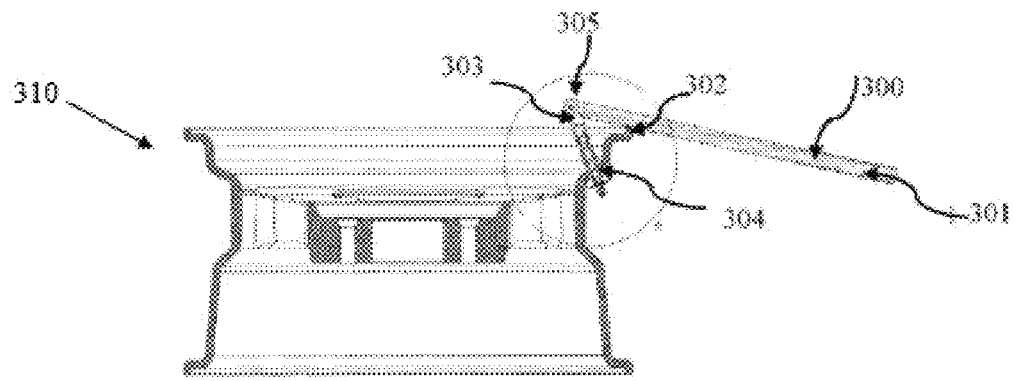
Fig. 3a
Prior Art
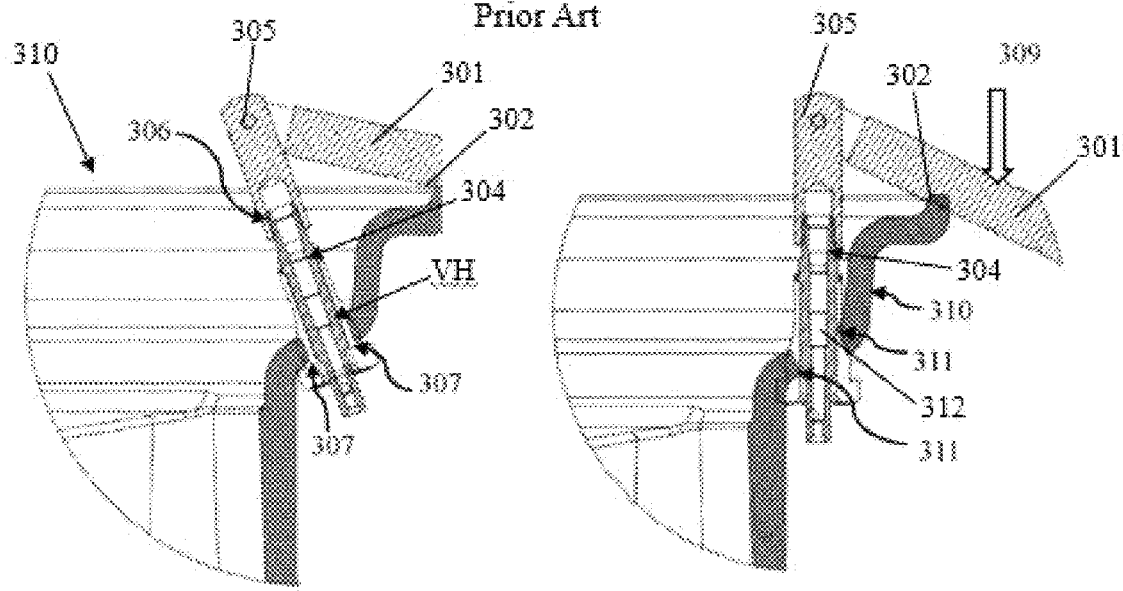
Fig. 3b
Prior Art
Fig. 3c
Prior Art
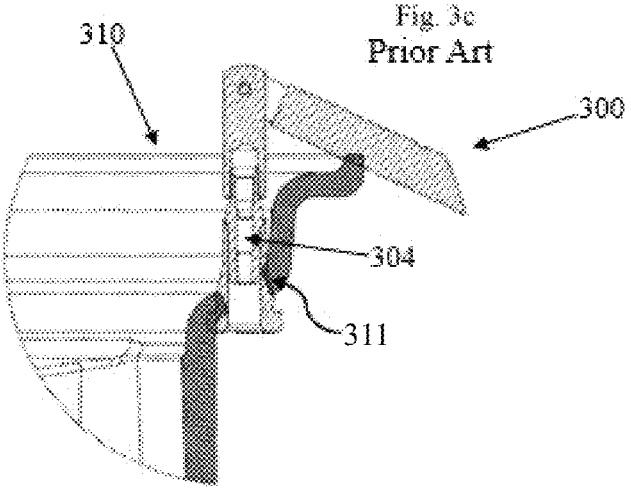
Fig. 3d
Prior Art

ARTICULATING TIRE VALVE STEM INSTALL-REMOVAL TOOL AND RELATED METHODS

REFERENCED APPLICATIONS

The present disclosure claims priority on U.S. Provisional Patent Application Ser. No. 63/407,824 filed Sep. 19, 2022, which is fully incorporated herein by reference.

TECHNICAL FIELD

The present disclosure relates generally to a tool that removes/installs valve stems from/on a wheel of a vehicle, and particularly to an articulating tire valve stem install-removal tool for use to install/remove valve stems (e.g., rubber valve stems, etc.) on/from a wheel on a passenger or light truck vehicle and to related methods for using the articulating tire valve stem install-removal tool.

BACKGROUND OF DISCLOSURE

Passenger and light truck vehicles commonly have valve stems attached to the wheel as a means to inflate, deflate, or otherwise regulate the tire and gauge tire pressure in the wheel. There are two common types of valves stems used in these applications, namely a) a clamp-in style that uses a nut on a threaded member to attach and seal the valve to the wheel, and b) a rubber snap-in style which is a brass member over-molded with rubber that seals and attaches against the wheel by compression.

US Federal regulations enacted in 2006 require that passenger and light tuck vehicles have a Tire Pressure Monitoring System (TPMS) as standard equipment on all new vehicles. The most common method of reading the tire pressure is to have a sensor attached to the valve inside the tire. Because of the use of such sensors, the valve design changed in order to have a method to attach the sensor to the valve. The most common method used is extending the brass portion of the valve stem into the wheel as an attachment point for the sensor. This change causes the valves to be more difficult to install and remove due to the restriction of rubber compression between the wheel and the extended brass member. Moreover, the force to install and remove the valve stem increased dramatically when the valve was not pulled in the rim hole perpendicular to the rim. Current valve install-removal tools have limitations adapting to this new valve style. Current valve install-removal tools cannot keep the valve perpendicular to the wheel, thus requiring an extensive amount of force to install or remove the valve on/from the wheel. In addition, some valve install-removal tools, due to the force required, can damage both the valve and the wheel during installation/removal, and/or the removal tool itself can be damaged or broken during use. Furthermore, some valve install-removal tools are un-ergonomic and cumbersome to use because of the amount of force required during the installation/removal of the valve stem on/from the wheel.

In view of the current state of valve stem removal tools, there is a need to provide a valve tool that can remove the rubber valves from the wheel of passenger vehicles and light trucks by pulling the valve stem perpendicular to the wheel, thereby reducing the force required for removal, inflicting less damage to the valve, inflicting less damage to the wheel rim, and being more ergonomic and user friendly to use.

SUMMARY OF DISCLOSURE

The presently disclosed subject matter relates to an articulating tire valve install-removal tool and related methods. Particularly, the articulating tire valve install-removal tool has a body comprising an outer perimeter, an inner recess, a threaded member, a linkage, and a contact member. The articulating tire valve install-removal tool components are connected to each other and secured within the body so one or more components can rotate around one or more axes. Together these components facilitate in the valve being installed and removed perpendicular or generally perpendicular to the valve hole on the wheel. The articulating tire valve stem tool includes a linkage assembly that is attached to the body to facilitate in ensuring the valve is installed and removed with the valve perpendicular to the valve hole in the wheel rim. The articulating tire valve stem tool includes a contact member that includes a feature that prevents slipping on the rim during use in addition to acting as a fulcrum to increase mechanical advantage during the use of the articulating tire valve install-removal tool. The articulating tire valve stem install-removal tool includes a contact member that has a feature that inhibits or prevents damage or slipping on the wheel during use in addition to acting as a fulcrum to increase mechanical advantage during the use of the articulating tire valve install-removal tool. The contact member also includes a feature to lock the threaded member parallel or generally parallel to the body which allows for the device to attach to the valve quickly. The body of the articulating tire valve stem tool reduces deflection, increases ergonomics and is more durable due to the design.

In accordance with one non-limiting objective of the present disclosure, there is provided an articulating tire valve stem install-removal tool that includes a) a body that defines an interior space for holding a threaded member, a linkage, and a contact member, and b) an articulating assembly that is attached to the inner space of the body and comprising the threaded member, the linkage, and the contact member, and wherein the articulating assembly is configured to rotate around multiple axes to ensure a direction of a tire valve that is releasably connected to the articulating tire valve stem install-removal tool is perpendicular or generally perpendicular to a valve hole in a wheel rim to thereby reduce a required force to install and remove the valve from the wheel rim.

In accordance with another non-limiting objective of the present disclosure, there is provided an articulating tire valve stem install-removal tool that includes a contact member and wherein the contact member includes locking steps that facilitate in securing the contact member to the rim by inhibiting or preventing forward movement by the contact member on the valve of the wheel rim.

In accordance with another non-limiting objective of the present disclosure, there is provided an articulating tire valve stem install-removal tool that includes a contact member that includes a locking feature that facilitates in ensuring the threaded member is parallel or generally parallel to the body of the valve so that the articulating tire valve stem install-removal tool can be easily and/or quickly attached to the valve. objective In accordance with another non-limiting objective of the present disclosure, there is provided an articulating tire valve stem install-removal tool that includes a contact member that is configured to be used as a fulcrum point to increase a mechanical advantage when installing and/or removing a valve from a wheel rim.

In accordance with another non-limiting objective of the present disclosure, there is provided an articulating tire valve stem install-removal tool wherein the body has a thickness that increases the robustness of the articulating tire valve stem install-removal tool and/or improves ergonomics of the articulating tire valve stem install-removal tool.

In accordance with another non-limiting objective of the present disclosure, there is provided a method for installing a valve on a wheel comprising a) providing an articulating tire valve stem install-removal tool that includes i) a body that defines an interior space for holding a threaded member, a linkage, and a contact member, and ii) an articulating assembly that is attached to the inner space of the body and comprises the threaded member, the linkage, and the contact member, and wherein the articulating assembly is configured to rotate around multiple axes to ensure a direction of a tire valve that is releasably connected to the articulating tire valve stem install-removal tool is perpendicular or generally perpendicular to a valve hole in a wheel rim to thereby reduce a required force to install and remove the valve from the wheel rim, and one or more of b) ensuring the valve is perpendicular during installation and/or removal from the wheel rim to reduce the installation and removal force required to install the valve on and/or remove the valve from the wheel rim, c) ensuring the contact member holds on the wheel rim to inhibit or prevent slipping of the articulating tire valve stem install-removal tool relative to the wheel rim, and/or d) ensuring the threaded member remains parallel to the body of the valve for quick attachment to of the valve to the valve stem.

One non-limiting objective of the disclosure is the provision of an articulating tire valve stem install-removal tool for removing a tire valve from a valve hole in a wheel rim comprising a body, a rotating threaded member, an articulating rim contact member, a connecting linkage, and a handle; each of the rotating threaded member, the articulating rim contact member, and the linkage are movably connected to the body; the handle is connected to the body and spaced from one or more of the rotating threaded member, the articulating rim contact member, and the linkage; the articulating tire valve install-removal tool is configured to remove a tire valve from a wheel rim while a longitudinal axis of the tire valve remains parallel or nearly parallel to a valve hole longitudinal axis of a valve hole in the wheel rim during removal of the tire valve from the wheel rim.

In another non-limiting objective of the disclosure is the provision of an articulating tire valve stem install-removal tool for removing a tire valve from a valve hole in a wheel rim wherein the rotating threaded member is configured to be threadedly connected to a valve stem of the tire valve.

In another non-limiting objective of the disclosure is the provision of an articulating tire valve stem install-removal tool for removing a tire valve from a valve hole in a wheel rim wherein the body includes a slot region that is located between two side arms of the body; at least a portion of the articulating rim contact member and the rotating threaded member are rotatably positioned in the slot region.

In another non-limiting objective of the disclosure is the provision of an articulating tire valve stem install-removal tool for removing a tire valve from a valve hole in a wheel rim wherein a) a longitudinal length of the slot region is at least 50% of a total longitudinal length of the body, b) a width of the slot region is constant along 50-100% of the longitudinal length of the slot region, and/or c) a maximum width of the slot region is at least 40% of a minimum width of the body.

In another non-limiting objective of the disclosure is the provision of an articulating tire valve stem install-removal tool for removing a tire valve from a valve hole in a wheel rim wherein the rotating threaded member is pivotally connected to a front portion of the body; the rotating threaded member is hingedly connected to a first end of the connecting linkage; a second end of the connecting linkage is hingedly connected to a top portion of the articulating rim contact member; the articulating rim contact member is pivotally connected to the body, and wherein an interconnection between the rotating threaded member, the connecting linkage, and the articulating rim contact member results in interactive movement between the rotating threaded member and the articulating rim contact member during operation of the articulating tire valve install-removal tool.

In another non-limiting objective of the disclosure is the provision of an articulating tire valve stem install-removal tool for removing a tire valve from a valve hole in a wheel rim wherein the articulating rim contact member is positioned rearwardly on the body from the rotating threaded member.

In another non-limiting objective of the disclosure is the provision of an articulating tire valve stem install-removal tool for removing a tire valve from a valve hole in a wheel rim wherein the handle is rigidly connected to a rear portion of the body.

In another non-limiting objective of the disclosure is the provision of an articulating tire valve stem install-removal tool for removing a tire valve from a valve hole in a wheel rim wherein a longitudinal length of the handle is greater than a longitudinal length of the body.

In another non-limiting objective of the disclosure is the provision of an articulating tire valve stem install-removal tool for removing a tire valve from a valve hole in a wheel rim wherein a) a front portion of the rotating threaded member extends outwardly from the body during 70-100% of a tire valve removal process, and/or b) a top portion and bottom portion of the articulating rim contact member both extend outwardly from the body during 70-100% of the tire valve removal process.

In another non-limiting objective of the disclosure is the provision of an articulating tire valve stem install-removal tool for removing a tire valve from a valve hole in a wheel rim wherein a base of the articulating rim contact member includes one or more locking points that are configured to releasably engage a portion of the wheel rim during use of the articulating tire valve install-removal tool during a tire valve removal process.

In another non-limiting objective of the disclosure is the provision of an articulating tire valve stem install-removal tool for removing a tire valve from a valve hole in a wheel rim wherein one or more of the locking points has a step-like configuration that includes a flat base portion and a flat back portion that extends downwardly from the base portion at an angle of about 80-100°; one or more of the locking points are configured to limit movement of a base of the articulating rim contact member relative to the wheel rim during a tire valve removal process.

In another non-limiting objective of the disclosure is the provision of method for removing a tire valve from a tire valve hole in a wheel rim comprising a) providing the wheel rim that includes the tire valve; the tire valve at least partially positioned in the tire valve hole in the wheel rim; b) providing an articulating tire valve stem install-removal tool comprising a body, a rotating threaded member, an articulating rim contact member, a connecting linkage. and a handle; each of the rotating threaded member, the articulating rim contact member, and the linkage are movably connected to the body; the handle is connected to the body and spaced from one or more of the rotating threaded member, the articulating rim contact member, and the linkage; c) connecting the rotating threaded member to a top portion of the tire valve; d) positioning a bottom portion of the articulating rim contact member on a top surface of the wheel rim; e) applying a downward force on the handle to cause the tire valve to be lifted upwardly from the wheel rim; and wherein the articulating tire valve install-removal tool is configured to remove the tire valve from the tire valve hole while a longitudinal axis of the tire valve remains parallel or nearly parallel to a valve hole longitudinal axis of the tire valve hole during removal of the tire valve from the wheel rim.

In another non-limiting objective of the disclosure is the provision of a method for removing a tire valve from a valve hole in a wheel rim wherein the tire valve rotates less than 20° about the valve hole longitudinal axis of the tire valve hole during removal of the tire valve from the wheel rim.

In another non-limiting objective of the disclosure is the provision of an articulating tire valve stem install-removal tool for removing a tire valve from a valve hole in a wheel rim wherein the articulating tire valve install-removal tool has several benefits and advantages over prior art valve removal devices such as a) increasing the life of the articulating tire valve install-removal tool, b) reducing incidence of damage to the tire valve, c) reducing incidence of damage to the wheel rim, and/or d) reducing the force required by the user to install and/or remove the tire valve.

In another non-limiting objective of the disclosure is the provision of an articulating tire valve stem install-removal tool for removing a tire valve from a valve hole in a wheel rim wherein some of the non-limiting features of the articulating tire valve install-removal tool include a) a fulcrum point that gives the user a better mechanical advantage when installing and removing tire valves, b) a non-damaging contact point for engagement with the wheel rim that reduces or eliminates damage to the wheel rim, c) a locking feature that keeps the articulating tire valve install-removal tool secured to the wheel rim during use, d) a detent incorporated into the linkage of the articulating tire valve install-removal tool that allows the articulating tire valve install-removal tool to lock in a parallel direction when it is screwed/fastened to the valve, e) the body can be thicker, thus the articulating tire valve install-removal tool can be more durable and ergonomic, and/or f) the design reduces the force required to install and remove valves on/from the wheel rim which benefits the user.

These and other advantages will become apparent to those skilled in the art upon the reading and following of this description.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. Reference may now be made to the drawings, which illustrate various embodiments that the disclosure may take in physical form and in certain parts and arrangement of parts wherein:

FIG. 1 illustrates an isometric view of a valve install-removal tool connected to a valve and placed on a wheel in accordance with embodiments of the present disclosure.

FIG. 2a illustrates a front view of a Tire Pressure Monitor System (TPMS valve stem.

FIG. 2b illustrates a cross-sectional front view of the TPMS valve stem shown in FIG. 2a.

FIG. 2c illustrates a cross-sectional front view of a NON-TPMS valve stem.

FIG. 3a illustrates a cross-sectional front view of a valve install-removal tool connected to a valve and placed on a wheel.

FIG. 3b illustrates a detailed cross-sectional front view of a valve install-removal tool connected to a TPMS valve being inserted into the rim.

FIG. 3c illustrates a detailed cross-sectional front view of a valve install-removal tool connected to a TPMS valve being removed from the rim.

FIG. 3d illustrates a detailed cross-sectional front view of a valve install-removal tool connected to a NON-TPMS valve being removed from the rim.

FIG. 4b illustrates a cross-sectional front view of an articulating tire valve install-removal tool shown in FIG. 4a.

DETAILED DESCRIPTION OF NON-LIMITING EMBODIMENTS

Figure 4A:
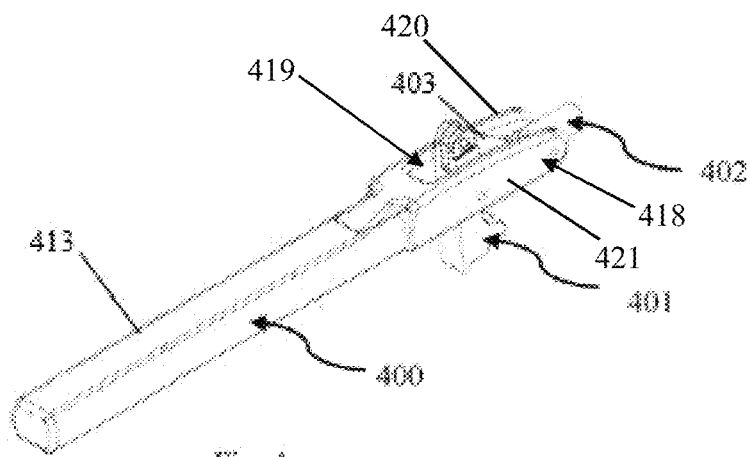
FIG. 4a illustrates an isometric view of an articulating tire valve install-removal tool.

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

For the sake of simplicity, the attached figures may not show the various ways (readily discernable, based on this disclosure, by one of ordinary skill in the art) in which the disclosed system, method and apparatus can be used in combination with other systems, methods and apparatuses. Additionally, the description sometimes uses terms such as "produce" and "provide" to describe the disclosed method. These terms are abstractions of the actual operations that can be performed. The actual operations that correspond to these terms can vary depending on the particular implementation and are, based on this disclosure, readily discernible by one of ordinary skill in the art.

Referring now to FIG. 1, there is illustrated a standard wheel rim 100 and an isometric view of a prior art valve install-removal tool 101 that is connected to a valve 102 used to remove the tire valve 102 from the wheel rim 100. As illustrated in FIG. 1, a downward force 103 is applied at or near the end portion of the handle of valve install-removal tool 101 to create a fulcrum force such that a portion of the handle of valve install-removal tool 101 pivots on the edge of the wheel rim to cause a lifting force on the tire valve that is non-perpendicular to the longitudinal axis of the valve hole longitudinal axis VHA of a valve hole VH so as to remove tire valve 102 from wheel rim 100. Such non-perpendicular force to the tire valve 102 during removal can result in damage to the wheel rim, damage to the tire valve 102 and/or damage to the valve install-removal tool 101.

Referring now to FIG. 2a, there is illustrated a front view of one non-limiting type of prior art TPMS valve 102 where the stem 202 (e.g., brass stem, etc.) is over-molded by rubber jacket or coating 200 (or some other polymeric material), and wherein the rubber jacket or coating forms a sealing area 201 and seat area 203 on an outer surface of rubber jacket or coating 200.

Referring now to FIG. 2b, there is illustrated a cross-sectional view of one non-limiting type of prior art TPMS valve 102 of FIG. 2a. As illustrated in FIG. 2b, TPMS valve 102 includes a valve core chamber 206 where pressurized fluid is received to inflate the tire (not shown) that is connected to wheel rim 100. Stem 202 extends through the valve body shown by 204 and the end portion of stem 202 includes a TPMS sensor. As can be appreciated, TPMS valve 102 can have other configurations and/or structures.

Referring now to FIG. 2c, there is illustrated a cross-sectional front view of one non-limiting type of prior art non-TPMS valve stem 208 (e.g., brass stem, etc.). As illustrated in FIG. 2c, the base portion 207 of non-TPMS valve stem 202 does not extend below sealing area 201 and seating area 203; however, it will be appreciated that non-TPMS valve 208 stem can have other configurations.

Referring now to FIG. 3a, there is illustrated a cross-sectional front view of a prior art valve install-removal tool 300 connected to a tire valve 304 (e.g., TPMS valve, non-TPMS valve, etc.) that is installed on a wheel rim 310. Valve install-removal tool 300 has a handle 301, and a threaded member 303 to connect to valve 304. The front portion of handle 301 includes an articulation point 305 that connects handle 301 to the threaded member. A front region of handle 302 is located on an edge of wheel rim 310 and functions as a fulcrum point to facilitate in the removal of valve 304 from the wheel rim.

Referring now to FIG. 3b, there is illustrated a detailed cross-sectional front view of valve install-removal tool 300 connected to a TPMS valve 304 that is being inserted into/removed from valve hole VH of wheel rim 310. The mouth 306 of TPMS valve 304 is illustrated as being threaded onto threaded member 303 of valve install-removal tool 300. TPMS valve 304 has a compressed rubber outer jacket or coating to provide a seal 307 to wheel rim 310.

Referring now to FIG. 3c, there is illustrated a detailed cross-sectional front view of valve install-removal tool 300 that is connected to a TPMS valve being removed from valve hole VH of wheel rim 310. During the removal process, stem 312 of tire valve 304 is caused to rotate from the upward non-perpendicular force being applied to tire valve 304 as a downward force 309 is applied to handle 301 of valve install-removal tool 300. Such rotation of tire valve 304 can result during either the insertion or removal of tire valve 304 from wheel rim 310. The rotation of tire valve 304 can result in wheel rim 310 pinching and/or damage to the rubber outer jacket or coating 311 on stem 312, thereby potentially resulting in an air leak and/or reduced life to tire valve 304. Downward force 309 can also result in damage to wheel rim 310 (e.g., denting, scratching, etc.), and/or damage to one or more components of valve install-removal tool 300 (e.g., bent handle, broken or damaged articulation point 305, stripping of threads on threaded member 303, etc.).

Referring now to FIG. 3d, there is illustrated a detailed cross-sectional front view of a valve install-removal tool 300 connected to a NON-TPMS valve 304 that is being removed from valve hole VH of wheel rim 310. The components of valve install-removal tool 300 and wheel rim are generally the same as illustrated in FIG. 3c. Likewise, the structures of tire valve 304 illustrated in FIGS. 3c and 3d are generally the same except for the absence of the sensor in the tire valve of FIG. 3d. Furthermore, the problems associated with the removal/insertion of tire valve 304 from/into valve hole VH of wheel rim 310 are similar to the problems discussed above with respect to FIG. 3c.

Referring now to FIGS. 4a-5c, there is illustrated the articulating tire valve install-removal tool objective in accordance with the present disclosure and a method for using the articulating tire valve install-removal tool objective that overcomes the above discussed problems associated with the use of prior art valve install-removal tools.

Referring now to FIGS. 4a-4e, there is illustrated one non-limiting embodiment of the articulating tire valve install-removal tool objective in accordance with the present disclosure. Articulating tire valve install-removal tool 400 includes a body 418, threaded member 402, a contact member 401, a linkage 403, and a handle 413. Threaded member 402, a contact member 401, and linkage 403 are all movable connected to body 418. The handle is non-movable connected to body 418.

Articulating tire valve install-removal tool 400 is configured to enable tire valves 102 to be installed and/or removed parallel or nearly parallel (e.g., 0.001-10° to an axis parallel to the VHA and all values and ranges therebetween) to a valve hole longitudinal axis VHA of a valve hole VH on a wheel rim 100. In this way, the force to install and/or remove tire valve 102 to/from valve hole VH on wheel rim 100 is reduced. Advantageously, potential damage to wheel rim 100 and tire valve 102 are reduced when the force applied to tire valve 102 during installation and/or removal is parallel or nearly parallel to valve hole longitudinal axis VHA of a valve hole VH. The configuration of articulating tire valve install-removal tool 400 to enable tire valve 102 to be installed and/or removed is parallel or nearly parallel to valve hole longitudinal axis VHA of a valve hole VH has several benefits and advantages over prior art valve removal devices as illustrated in FIGS. 3a-3d such as a) increasing the life of articulating valve install-removal tool 400, b) reducing incidence of damage to tire valve 102, c) reducing incidence of damage to wheel rim 100, and/or d) reducing the force required by the user to install and/or remove tire valve 102. Some of the non-limiting features of articulating tire valve install-removal tool 400 include a) a fulcrum point 501 on articulating tire valve install-removal tool 400 gives the user a better mechanical advantage when installing and removing tire valves, b) articulating tire valve install-removal tool 400 has a non-damaging contact point for engagement with wheel rim 100 that reduces or eliminates damage to the wheel rim, c) a locking feature 406 on articulating tire valve install-removal tool 400 that keeps articulating tire valve install-removal tool 400 secured to the wheel rim during use, d) a detent incorporated into the linkage 403 of the articulating tire valve install-removal tool 400 that allows articulating tire valve install-removal tool 400 to lock in a parallel direction when it is screwed/fastened to the valve, e) the body of articulating tire valve install-removal tool 400 is thicker, thus articulating tire valve install-removal tool 400 is more durable and ergonomic, and f) the design of articulating tire valve install-removal tool 400 reduces the force required to install and remove valves on/from the wheel rim which benefits the user.

Articulating tire valve install-removal tool 400 can be partially or fully constructed from any desired rigid or semi-rigid material such as, but not limited to, metal (e.g., iron, steel, stainless steel, aluminum, aluminum alloy, copper, copper alloy, etc.), polymeric material, composite material, wood, and combinations thereof.

Referring now to FIG. 4a, there is illustrated an isometric view of articulating tire valve install-removal tool 400. Articulating tire valve install-removal tool 400 includes a body 418, an articulating rim contact member 401, a handle 413, and a rotating threaded member 402, wherein rotating threaded member 402 is configured to connect to valve stem 202 of a tire valve 102.

Figure 4B:
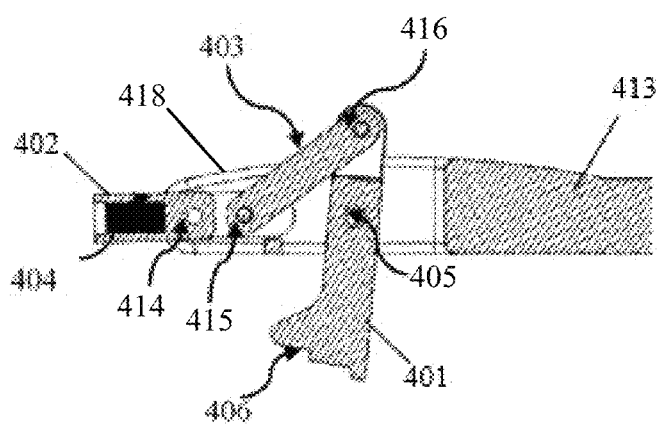

Referring now to FIG. 4b, a cross-sectional front view of articulating tire valve install-removal tool 400 is illustrated. Rotating threaded member 402 includes threads 404 that are configured to threadedly engage a threaded top region of tire valve 102.

Body 418 is illustrated as including a slot region 419 that is located between two side arms 420, 421 of body 418. A portion of articulating rim contact member 401 and rotating threaded member 402 are rotatably positioned in the slot region 419. The longitudinal length of the slot region is illustrated as being at least 50% (e.g., 50-95% and all values and ranges therebetween) of a total longitudinal length of body 418. The width of slot region 419 is illustrated as being constant along 50-100% (and all values and ranges therebetween) of the longitudinal length of slot region 419. The maximum width of the slot region is at least 40% (e.g., 40-95% and all values and ranges therebetween) of a minimum width of body 418.

Rotating threaded member 402 is pivotally connected to a front portion of body 418 at pivot connection 414 (e.g., pin connection, etc.). Rotating threaded member 402 is also hingedly connected to a first end of a connecting linkage 403 at hinge point 415. The second end of connecting linkage 402 is hingedly connected to a top portion of articulating rim contact member 401 at hinge point 416. Articulating rim contact member 401 is also pivotally connected to body 418 at pivot connection 405 (e.g., pin connection, etc.). Pivot connection 405 is positioned rearwardly on body 418 from pivot connection 414. Also, articulating rim contact member 401 is positioned rearwardly on body 418 from rotating threaded member 402. The interconnection between rotating threaded member 402, connecting linkage 403, and articulating rim contact member 401 results in interactive movement between rotating threaded member 402 and articulating rim contact member 401 during the operation of articulating tire valve install-removal tool 400 as will be discussed in further detail below. Handle 413 is rigidly connected to the rear of body 418. The longitudinal length of handle 413 is illustrated as being greater than a longitudinal length of body 418. Handle 413 can be connected to body 418 by any type of means (e.g., slot connection, adhesive connection, pin connection, screw, and/or nail connection, clamp connection, etc.). During operation of articulating tire valve install-removal tool 400, the front portion of rotating threaded member 402 extends outwardly from the 419 during 70-100% (and all values and ranges therebetween) of the tire valve removal process. Also, the top portion and bottom portion of articulating rim contact member 401 both extend outwardly from body 419 during 70-100% (and all values and ranges therebetween) of the tire valve removal process.

The base of articulating rim contact member 401 includes one or more locking points 406 that are configured to releasably engage a portion of wheel rim 100 during use of articulating tire valve install-removal tool 400. The shape of each locking point 406 is non-limiting. As illustrated in FIG.

4b, the base of articulating rim contact member 401 includes two locking points 406 that have a step-like configuration, wherein each locking point 406 includes a flat base portion and a flat back portion that extends downwardly from the base portion and is angled about 80-100° (and all values and ranges therebetween) relative to the flat base portion. As can be appreciated, one or more of locking points 406 could have a notch configuration, a rib configuration, etc. Locking points 406 are used to limit movement of the base (e.g., forward movement of the base, etc.) of articulating rim contact member 401 relative to the wheel rim as handle 413 is forced downwardly during a tire valve removal process that will be discussed in more detail below.

Figure 4C:
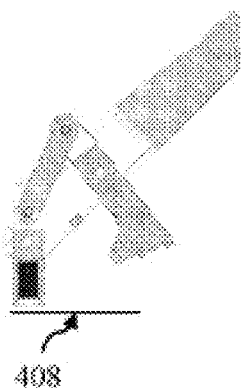
FIG. 4c illustrates a cross-sectional front view of an articulating tire valve install-removal tool shown in FIG. 4b at the initial install point.
Figure 4D:
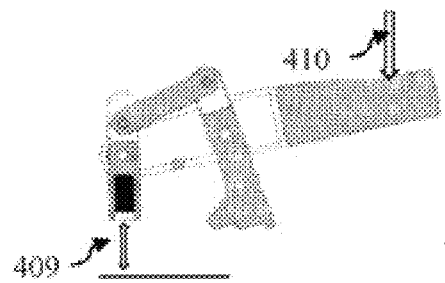
FIG. 4d illustrates a cross-sectional front view of an articulating tire valve install-removal tool shown in FIG. 4b at the location where the valve has been installed.
Figure 4E:
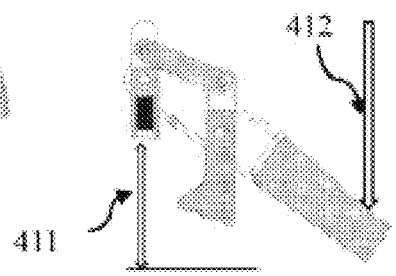
FIG. 4e illustrates a cross-sectional front view of an articulating tire valve install-removal tool shown in FIG. 4b at the location where the valve has been removed.

Referring now to FIGS. 4c-4e, there is illustrated a cross-sectional front view of articulating tire valve install-removal tool 400 at different positions during the operation of removing a tire valve from a wheel rim. In each of these figures, the wheel rim and tire valve are not shown. Base line 408 is a representation of a plane of the top surface of the wheel rim adjacent to the tire valve that is perpendicular to the central longitudinal axis of a tire valve when the tire valve is fully inserted in the wheel rim. As will be described in more detail, articulating tire valve install-removal tool 400 is configured to enable the central longitudinal axis of rotating threaded member 402 to remain parallel or nearly parallel (e.g., ±10° to parallel and all values and ranges therebetween) to the central longitudinal axis of the tire valve during the complete operation of near complete operation (e.g., 70-99.999% of complete operation of removal and all values and ranges therebetween) of removing the tire valve from the wheel rim. As discussed above, the ability of articulating tire valve install-removal tool 400 to enable the central longitudinal axis of rotating threaded member 402 to remain parallel or nearly parallel to the central longitudinal axis of the tire valve during the complete operation of near complete operation of removing the tire valve from the wheel rim results in one or more or all of a) increasing the life of articulating tire valve install-removal tool 400, b) reducing incidence of damage to tire valve 102, c) reducing incidence of damage to wheel rim 100, d) reducing the force required by the user to install and/or remove tire valve 102, e) provides the user a better mechanical advantage when installing and removing the tire valves, and/or f) reduces the force required to install and remove valves on/from the wheel rim.

FIG. 4c illustrates the position of articulating tire valve install-removal tool 400 prior to the pulling of the tire valve from the wheel rim. The central longitudinal axis of rotating threaded member 402 is generally perpendicular to base line 408. At this position of articulating tire valve install-removal tool 400, rotating threaded member 402 can be threadedly connected to the top portion of the tire valve.

FIG. 4d illustrates a cross-sectional front view of articulating tire valve install-removal tool 400 wherein the tire valve has been partially (e.g., 10-70% and all values and ranges therebetween) removed from the wheel rim. As the handle 413 is pushed down by a user a handle distance 410, the interconnection between threaded member 402, connecting linkage 403, and articulating rim contact member 401 results in the upward movement of rotating threaded member 402 as represented by move distance 409. Generally, handle distance 410 is greater than move distance 409 during the tire valve removal process. As illustrated in FIG. 4d, the bottom portion of articulating rim contact member 401 moves toward the central longitudinal axis of rotating threaded member 402 as the handle is moved downwardly during the tire valve removal proves as illustrated in FIGS. 4c-4e. The central longitudinal axis of rotating threaded member 402 remains generally perpendicular to base line 408.

FIG. 4e illustrates a cross-sectional front view of articulating tire valve install-removal tool 400 wherein the tire valve has been fully removed from the wheel rim. As handle 413 is pushed down by a user a handle distance 412, the interconnection between rotating threaded member 402, connecting linkage 403, and articulating rim contact member 401 results in the upward movement of rotating threaded member 402 as represented by move distance 411. Handle distance 412 is greater than move distance 411. As illustrated in FIG. 4e, the distance between the bottom portion of articulating rim contact member 401 and the central longitudinal axis of rotating threaded member 402 decreases as handle 413 is moved downwardly during the tire valve removal process. The central longitudinal axis of rotating threaded member 402 remains generally perpendicular to base line 408. During operation of articulating tire valve install-removal tool 400, the bottom portion of articulating rim contact member 401 remains in a generally fixed position relative to wheel rim 100 due to locking feature 406 on the bottom portion of articulating rim contact member 401. As illustrated in FIGS. 4c-4e, the bottom portion of articulating rim contact member 401 pivots on wheel rim 100 during the tire valve removal process.

As illustrated in FIGS. 4c-4e, the pivot connection 414 and hinge connection 415 move upwardly relative to pivot connection 405 as handle 413 is moved downwardly. As illustrated in FIG. 4c, both pivot connection 414 and hinge connection 415 are positioned below pivot connection 405 at the beginning of the tire valve removal process, and both pivot connection 414 and hinge connection 415 are positioned above pivot connection 405 at the completion of the tire valve removal process.

Figure 5A:
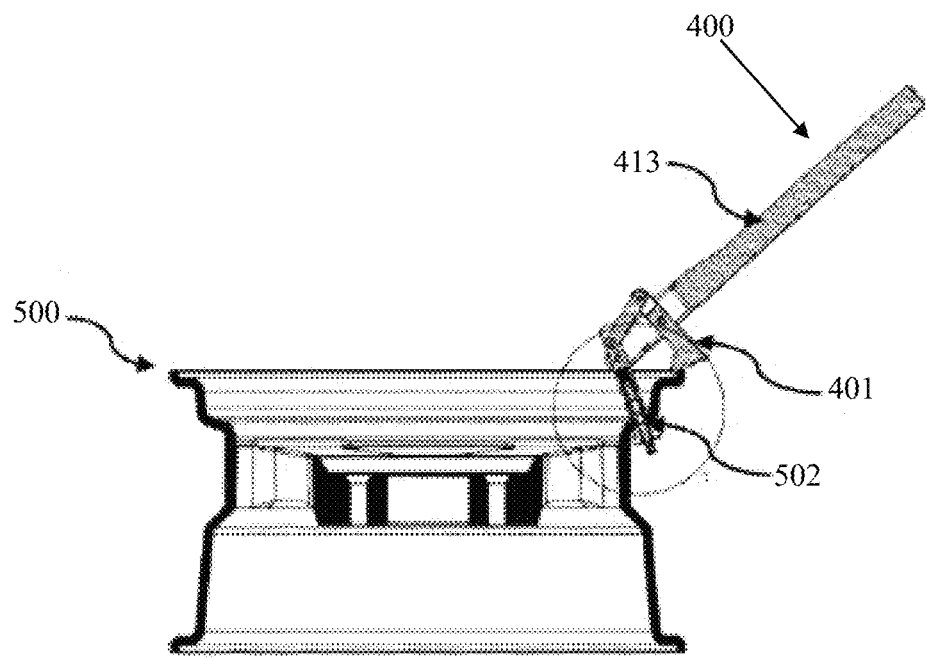
FIG. 5a illustrates a cross-sectional front view of an articulating tire valve install-removal tool connected to a valve and placed on a wheel.
Figure 5B:
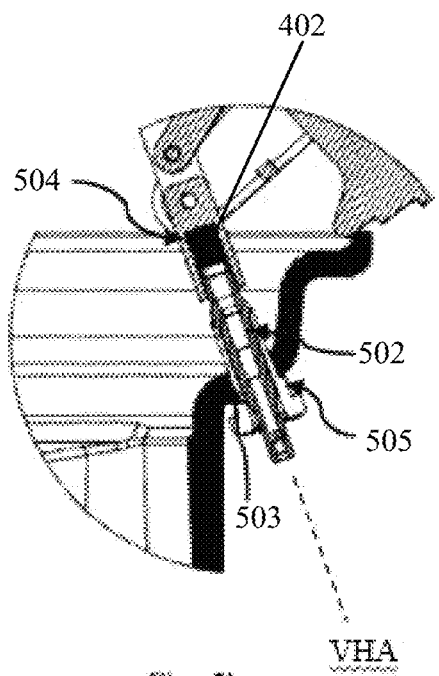
FIG. 5b illustrates a detailed cross-sectional front view of an articulating tire valve install-removal tool connected to a TPMS valve being inserted into a wheel.
Figure 5C:
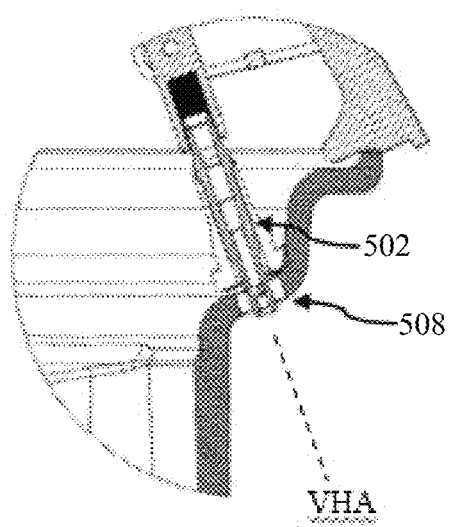
FIG. 5c illustrates a detailed cross-sectional front view of an articulating tire valve install-removal tool connected to a TPMS valve being removed from a wheel.

Referring now to FIGS. 5a-5c, there is illustrated a cross-sectional front view of articulating tire valve install-removal tool 400 at the beginning position during the operation of removing a tire valve from a wheel rim. In each of these figures, the wheel rim and tire valve are shown with respect to articulating tire valve install-removal tool 400.

Referring now to FIG. 5a, there is illustrated a cross-sectional front view of articulating tire valve install-removal tool 400 connected to a tire valve 502 that is position in wheel rim 500.

Referring now to FIG. 5b, there is illustrated an enlarged detailed cross-sectional front view of articulating tire valve install-removal tool 400 connected to a TPMS valve 502 that is inserted in wheel rim 500 where the tool is threaded onto mouth 504 of valve 502. Valve 502 has a compressed rubber coating or jacket 505 to provide a seal 503 to the rim. The central longitudinal axis of rotating threaded member 402 is generally perpendicular to valve hole longitudinal axis VHA. This orientation remains the same or nearly the same during the tire valve removal process as discussed above with regard to FIGS. 4c-4e. TPMS valve 502 is fully inserted in wheel rim 500 and the orientation of articulating tire valve install-removal tool 400 relative to TPMS valve 502 in wheel rim 500 would be similar to the orientation of the articulating tire valve install-removal tool 400 as illustrated in FIG. 4c.

Referring now to FIG. 5c, there is illustrated an enlarged detailed cross-sectional front view of articulating tire valve install-removal tool 400 connected to a TPMS valve 502 wherein TPMS valve 502 has been partially removed from wheel rim 500. Such orientation of articulating tire valve install-removal tool 400 relative to TPMS valve 502 in wheel rim 500 would be similar to the orientation of articulating tire valve install-removal tool 400 as illustrated in FIG. 4d. The central longitudinal axis of rotating threaded member 402 remains generally perpendicular to valve hole longitudinal axis VHA. During the removal of TPMS valve 502 from wheel rim 500, TPMS valve 502, as it removed from wheel rim 500, does not rotate or has minimal rotation (e.g., 0-20° of rotation about VHA and all values and ranges therebetween). As illustrated in FIG. 5c, the base of TPMS valve 502 was been moved above rim hole 508. The little or no rotation of TPMS valve 502 during removal from wheel rim 500 inhibits or prevents pinch to the rubber coating or jacket on TPMS valve 502.

As illustrated in FIG. 5c, locking feature 406 on the bottom portion of articulating tire valve install-removal tool 400 engages portion of the wheel rim that keeps articulating tire valve install-removal tool 400 secured to the wheel rim during use and inhibits or prevents forward movement the base of articulating rim contact member 401 relative to the wheel rim as handle 413 is force downwardly during a tire valve removal process.

It will thus be seen that the objects set forth above, among those made apparent from the preceding description, are efficiently attained, and since certain changes may be made in the constructions set forth without departing from the spirit and scope of the disclosure, it is intended that all matter contained in the above description and shown in the accompanying drawings shall be interpreted as illustrative and not in a limiting sense. The disclosure has been described with reference to preferred and alternate embodiments. Modifications and alterations will become apparent to those skilled in the art upon reading and understanding the detailed discussion of the disclosure provided herein. This disclosure is intended to include all such modifications and alterations insofar as they come within the scope of the present disclosure. It is also to be understood that the following claims are intended to cover all of the generic and specific features of the disclosure herein described and all statements of the scope of the disclosure, which, as a matter of language, might be said to fall therebetween.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed:

1. An articulating tire valve stem install-removal tool for removing a tire valve from a valve hole in a wheel rim comprising a body, a rotating threaded member, an articulating rim contact member, a connecting linkage and a handle; each of said rotating threaded member and said articulating rim contact member are movably connected to said body; said handle is connected to said body and spaced from one or more of said rotating threaded member, said articulating rim contact member, and said connecting linkage; said articulating tire valve install-removal tool is configured to remove a tire valve from a wheel rim while a longitudinal axis of the tire valve remains parallel or nearly parallel to a valve hole longitudinal axis of a valve hole in the wheel rim during removal of the tire valve from the wheel rim; said rotating threaded member is pivotally connected to a front portion of said body; said rotating threaded member is hingedly connected to a first end of said connecting linkage; a second end of said connecting linkage is hingedly connected to a top portion of said articulating rim contact member; and wherein an interconnection between said rotating threaded member, said connecting linkage and said articulating rim contact member is configured to result in interactive movement between said rotating threaded member and said articulating rim contact member during operation of said articulating tire valve install-removal tool.

2. The articulating tire valve stem install-removal tool as defined in claim 1, wherein said rotating threaded member is configured to be threadedly connected to a valve stem of said tire valve.

3. The articulating tire valve stem install-removal tool as defined in claim 1, wherein said articulating rim contact member is positioned rearwardly on said body from said rotating threaded member.

4. The articulating tire valve stem install-removal tool as defined in claim 1, wherein said handle is rigidly connected to a rear portion of said body.

5. The articulating tire valve stem install-removal tool as defined in claim 1, wherein a longitudinal length of said handle is greater than a longitudinal length of said body.

6. The articulating tire valve stem install-removal tool as defined in claim 1, wherein a) a front portion of said rotating threaded member is configured to extend outwardly from said body during 70-100% of a tire valve removal process, and/or b) a top portion and bottom portion of said articulating rim contact member are configured to both extend outwardly from said body during 70-100% of the tire valve removal process.

7. The articulating tire valve stem install-removal tool as defined in claim 1, wherein a base of said articulating rim contact member includes one or more locking points that are configured to releasably engage a portion of the wheel rim during use of said articulating tire valve install-removal tool during a tire valve removal process.

8. The articulating tire valve stem install-removal tool as defined in claim 1, wherein said body includes a slot region that is located between two side arms of said body; at least a portion of said articulating rim contact member and said rotating threaded member are rotatably positioned in said slot region.

9. The articulating tire valve stem install-removal tool as defined in claim 8, wherein a) a longitudinal length of said slot region is at least 50% of a total longitudinal length of said body, b) a width of said slot region is constant along 50-100% of said longitudinal length of said slot region, and/or c) a maximum width of said slot region is at least 40% of a minimum width of said body.

10. An articulating tire valve stem install-removal tool for removing a tire valve from a valve hole in a wheel rim comprising a body, a rotating threaded member, an articulating rim contact member, a connecting linkage and a handle; each of said rotating threaded member and said articulating rim contact member are movably connected to said body; said handle is connected to said body and spaced from one or more of said rotating threaded member, said articulating rim contact member, and said connecting linkage; said articulating tire valve install-removal tool is configured to remove a tire valve from a wheel rim while a longitudinal axis of the tire valve remains parallel or nearly parallel to a valve hole longitudinal axis of a valve hole in the wheel rim during removal of the tire valve from the wheel rim; a base of said articulating rim contact member includes one or more locking points that are configured to releasably engage a portion of the wheel rim during use of said articulating tire valve install-removal tool during a tire valve removal process; one or more of said locking points has a step-like configuration that includes a flat base portion and a flat back portion that extends downwardly from said base portion at an angle of about 80-100°; one or more of said locking points are configured to limit movement of the base of said articulating rim contact member relative to the wheel rim during the tire valve removal process.

11. An articulating tire valve stem install-removal tool for removing a tire valve from a valve hole in a wheel rim; said articulating tire valve tool comprising a body, a rotating threaded member, an articulating rim contact member, a connecting linkage and a handle; each of said rotating threaded member and said articulating rim contact member are movably connected to said body; said connecting linkage is pivotally connected to said rotating threaded member and said articulating rim contact member; said connecting linkage is not connected to said body; said handle is connected to said body and is spaced from and is not connected to said rotating threaded member, said articulating rim contact member, and said connecting linkage; said articulating tire valve install-removal tool is configured to remove a tire valve from a wheel rim while a longitudinal axis of the tire valve remains parallel or nearly parallel a valve hole longitudinal axis of a valve hole in the wheel rim during removal of the tire valve from the wheel rim.

12. The articulating tire valve stem install-removal tool as defined in claim 11, wherein said rotating threaded member is configured to be threadedly connected to a valve stem of said tire valve.

13. The articulating tire valve stem install-removal tool as defined in claim 12, wherein said body includes a slot region that is located between two side arms of said body; at least a portion of said articulating rim contact member and said rotating threaded member are rotatably positioned in said slot region; a longitudinal length of said slot region is at least 50% of a total longitudinal length of said body; and a width of said slot region is constant along 50-100% of said longitudinal length of said slot region.

14. The articulating tire valve stem install-removal tool as defined in claim 13, wherein said rotating threaded member is pivotally connected to a front portion of said body; said rotating threaded member is hingedly connected to a first end of said connecting linkage; a second end of said connecting linkage is hingedly connected to a top portion of said articulating rim contact member; and wherein an interconnection between said rotating threaded member, said connecting linkage and said articulating rim contact member is configured to result in interactive movement between said rotating threaded member and said articulating rim contact member during operation of said articulating tire valve install-removal tool.

15. The articulating tire valve stem install-removal tool as defined in claim 14, wherein said articulating rim contact member is positioned rearwardly on said body from said rotating threaded member.

16. The articulating tire valve stem install-removal tool as defined in claim 15, wherein said handle is rigidly connected to a rear portion of said body; a longitudinal length of said handle is greater than said total longitudinal length of said body.

17. The articulating tire valve stem install-removal tool as defined in claim 16, wherein a) a front portion of said rotating threaded member is configured to extend outwardly from said body during 70-100% of a tire valve removal process; said top portion of said articulating rim contact member and a bottom portion of said articulating rim contact member are configured to both extend outwardly from said body during 70-100% of the tire valve removal process.

18. The articulating tire valve stem install-removal tool as defined in claim 17, wherein a base of said articulating rim contact member includes one or more locking points that are configured to releasably engage a portion of the wheel rim during use of said articulating tire valve install-removal tool during the tire valve removal process; one or more of said locking points has a step-like configuration that includes a flat base portion and a flat back portion that extends downwardly from said base portion at an angle of about 80-100°; one or more of said locking points are configured to limit movement of a base of said articulating rim contact member relative to the wheel rim during the tire valve removal process.

* * * * *